United States Patent [19]

Kuramoto

[11] Patent Number: 4,864,203
[45] Date of Patent: Sep. 5, 1989

[54] DIAGNOSTIC APPARATUS

[75] Inventor: Satoru Kuramoto, Kobe, Japan

[73] Assignee: Mitsubishi Denki Kabushiki Kaisha, Tokyo, Japan

[21] Appl. No.: 29,607

[22] Filed: Mar. 24, 1987

[30] Foreign Application Priority Data

Apr. 30, 1986 [JP] Japan .................................. 61-98152

[51] Int. Cl.$^4$ .............................................. G05B 19/42
[52] U.S. Cl. ............................... 318/563; 318/568.14; 318/568.24
[58] Field of Search ........... 318/563, 565, 568, 568 L; 364/474.19

[56] References Cited

U.S. PATENT DOCUMENTS

| | | | |
|---|---|---|---|
| 4,150,326 | 4/1979 | Engelberger et al. .......... | 318/568 L |
| 4,456,960 | 6/1984 | Wakai .............................. | 318/565 X |
| 4,471,219 | 9/1984 | Inaba et al. ..................... | 318/565 |
| 4,490,660 | 12/1984 | Tsuchihashi .................... | 318/565 |
| 4,585,981 | 4/1986 | Zintler ............................. | 318/563 |
| 4,718,078 | 1/1988 | Bleidorn et al. ................ | 318/563 X |

Primary Examiner—Benjamin Dobeck
Attorney, Agent, or Firm—Burns, Doane, Swecker & Mathis

[57] ABSTRACT

A diagnostic apparatus which diagnoses a failure of the machine by comparing a relation between the displacement amount of a varible for making the variable coincide with a target value while the machine is normally operated and the response time required thereof with that while the machine is actually operated. Accordingly the apparatus can diagnose the failure based on transient response while the machine is actually operated, so that early detection of the failure is possible without additional measures.

5 Claims, 4 Drawing Sheets

1st POSITION

N-th POSITION

DIAGNOSTIC APPARATUS

BACKGROUND OF THE INVENTION

1. Field of the Invention

This invention relates to a diagnostic apparatus of a metal processing machine such as, for example, a lathe and more particularly, to a diagnostic apparatus for a machine which is capable of setting a predetermined target value of variable to be controlled such as the position of or the speed needed for transferring position of a machine and/or its component members and executing automatic control operations to allow the variable to be controlled to correctly match the predetermined value.

2. Description of the Prior Art

Recently, the operations of a conventional metal processing machine such as a lathe are properly controlled by computer means. FIG. 1 is the schematic diagram showing an example of the constitution of a machine controlled by a computer.

The essential part of the computer-controlled machine 1 is provided with a pair of jaw members 11 and 12 used for holding the object to be processed. Driving mechanisms 21 and 22 cause these jaw members 11 and 12 to separate from and come closer to each other by moving the positions of the jaw members 11 and 12.

Motors as the driving sources 32 and 32 respectively drive the driving mechanisms 21 and 22, while these motors 31 and 32 are controlled by the control signals delivered from controlling means 5 described later on.

Position-sensors 41 and 42 respectively detect positions of the jaw members 11 and 12 of the machine 1 to be controlled. These sensors 41 and 42 are respectively secured to their bases for correctly sensing the relative positions of the jaw members 11 and 12. Data related to the detected positions of the jaw members 11 and 12 is delivered from sensors 41 and 42 to controller means 5 which applies control operations using fed-back control system.

As mentioned above, data related to the detected positions of the jaw members 11 and 12 is fed back to controlling means 5 from sensors 41 and 42. On receipt of the position data signal, controlling means 5 outputs control signals to motors 31 and 32.

The reference numeral 6 denotes setting means. This setting means may, for example, be part of the host control unit comprised of a microcomputer. An operator can either set the positions of those jaw members 11 and 12, or use the setting means 6. Generally, the detected position data is inputted to setting means 6 as the target value signal from the CPU which is not shown in FIG. 1. In other words, the data of specifying the interval 7 which should be set between the jaw members 11 and 12 are inputted to setting means 6 as the target value. Setting means 6 delivers data indicative of the target value to controlling means 5 as the aim-target value of the variable. Controlling means 5 then reads the respective positions of the jaw members 11 and 12, i.e., the variable, of the jaw members 11 and 12 detected by sensors 41 and 42 in order to ascertain the interval 7 between the jaw members 11 and 12, and the controlling means 5 determines a difference between the ascertained interval 7 and the target value delivered from setting means 6, and finally it outputs a specific control signal to motors 31 and 32 to make the difference zero. As a result, motors 31 and 32 are properly activated to allow controlling means 5 to execute feedback control operation to move the jaw members 11 and 12 so that the interval 7 between the jaw members 11 and 12 coincides with the target value inputted to setting means 6. The amount of the movement of the jaw members 11 and 12 corresponds to the displacement values of the variable.

Conventionally, in driving any machine having the typical constitution mentioned above, an operator has detected any failure or malfunction of machine itself or the driving and control systems in the manner shown below.

Normally, the operator judges the condition of the machine at the time of inspection before starting the operation, either by reference to the operating manual or on the basis of his own experiences. However, the operator can find failure of electrical control system only in the event of actual inoperativeness of the machine 1 itself, driving mechanisms 21 and 22 and motors 31 and 32. There is therefore a need to preliminarily detect any failure of machine itself and its component system and a need to always keep servicing staff for providing maintenance services.

SUMMARY OF THE INVENTION

The primary object of the present invention is to overcome those disadvantages mentioned above by providing a novel diagnostic apparatus which is capable of allowing an operator to preliminarily detect any failure of abnormal condition of the machine in its early stage detecting transient response of variable while actually driving the machine to be controlled, followed by comparison of the detected value to that during normal operations.

The second object of the present invention is to provide a novel diagnostic apparatus which is capable of saving labor for maintaining and inspecting, by detecting failure and abnormal condition of the machine automatically to be controlled while actually driving it.

The diagnostic apparatus related to the present invention correctly diagnoses any failure and abnormal condition of the machine to be controlled by automatically comparing the displaced condition of the variable of the machine during normal operations, i.e., the relation between the displacement value and the time required for its displacement, to those during actual operation.

Those and further objects as well as features of the present invention will be better understood from the following detailed description and the accompanying drawings.

DESCRIPTION OF THE PREFERRED EMBODIMENTS

Referring to the accompanying drawings, the diagnostic apparatus of the present invention is described below in detail.

Figure 1:
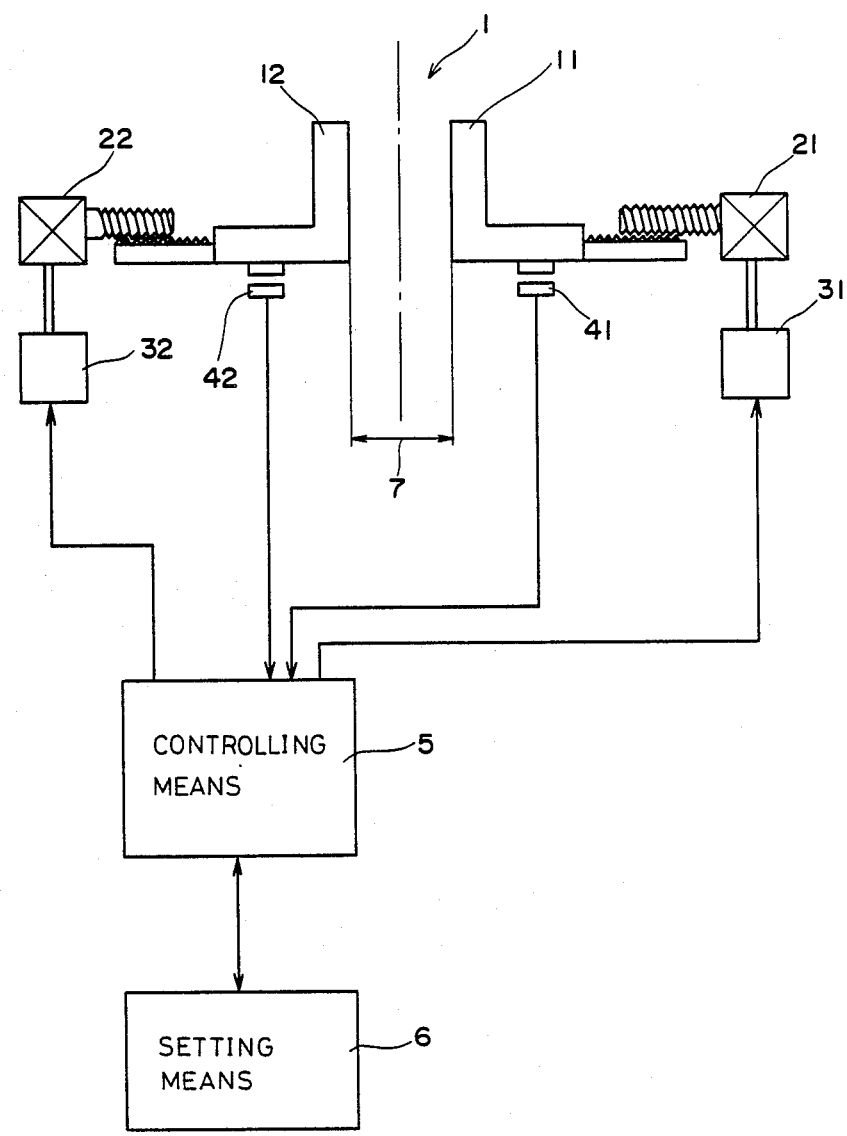
FIG. 1 is a schematic diagram showing a prior art arrangement.
Figure 2:
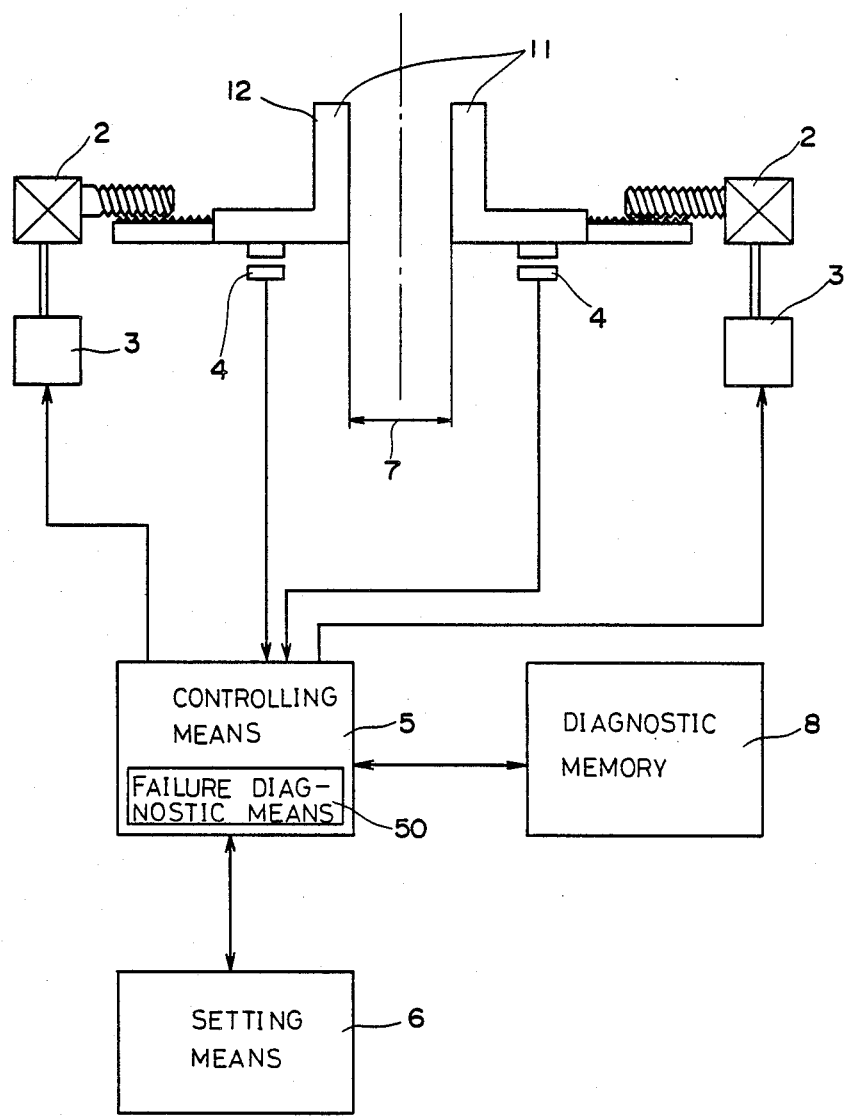
FIG. 2 is a schematic diagram showing the constitution one embodiment of a diagnostic apparatus according to the present invention and a machine to be controlled incorporating it.

FIG. 2 is the schematic diagram showing the constitution of the diagnostic apparatus of the invention and the machine to be controlled incorporating it. Note that those members which are either identical or equivalent to those which are show in FIG. 1 are provided with identical reference numerals in the following description.

The machine 1 to be controlled may be of a constitution identical to the conventional one shown in FIG. 1. The preferred embodiment is applied to the machine 1 comprising a pair of the jaw members 11 and 12 capable of securely holding any material designated for processing.

Driving mechanisms 21 and 22 respectively cause these jaw members 11 and 12 to separate from and come closer to each other by moving the position of the jaw members 11 and 12.

Motors 31 and 32 as the driving sources respectively drive these members 11 and 12, while motors 31 and 32 are operated by the control signal delivered from a controlling means 5 described later on.

Position sensors 41 and 42 respectively detect positions of these jaw members 11 and 12 of the machine to be controlled. These sensors 41 and 42 are respectively fixed to their base for correctly sensing the relative positions of the jaw members 11 and 12. A data related to the detected positions of the jaw members 11 and 12 is delivered from sensors 41 and 42 to the controlling means 5 which activates control operations using a feed-back control system. A data signal related to the detected positions of the jaw members 11 and 12 is fed back to the controlling means 5 from sensors 41 and 42. On receipt of the position data signal, the controlling means 5 outputs control signals to the motors 31 and 32.

In particular, the controller means 5 of the diagnostic apparatus of the present invention is provided with a failure diagnostic means 50 which diagnoses the machine and its component parts, using processes described later on.

The reference numeral 6 denotes setting means which, as a concrete example may be one of the integral parts of a host control unit comprised of a microcomputer. Although an operator can manually input the data related to the positions, i.e., the variable to be controlled, of the jaw members 11 and 12 to the setting means 6, in general, the detected data signal is inputted to the setting means 6 as the target value by applying a signal from a CPU which is not shown in FIG. 2. In other words, the data of an interval 7 which should be taken between the jaw members 11 and 12 are inputted to the setting means 6 as the target value.

A diagnostic memory 8 stores the data in conjunction with the transferred amount of the jaw members 11 and 12 at the typical position of the machine 1 under normal operations, i.e., the relation between the displacement value of the variable to be controlled and the response time required for the displacement. More concretely, with reference to FIG. 3, the diagnostic memory 8 stores the relations 9 and 10 between the displacement value (shown by horizontal axis) and its response time (shown by vertical axis) in the predetermined first through N-th positions this data may be stored in the table format denoted by approximate analysis or using an adequate step, for example.

Next, operations of the diagnostic apparatus of the present invention are described below.

As soon as the controlling means 5 receives a data signal denoting the interval 7 between the jaw members 11 and 12 being stored in the setting means 6 (which is the host controller) as the target value of the variable to be controlled, the controlling means 5 then reads the positions of both the jaw members 11 and 12 detected by the sensors 41 and 42 to determine the interval 7 between the jaw members 11 and 12. The controlling means 5 then computes the difference between the computed interval 7 and the target value delivered from the setting means 6, i.e., it calculates the displacement value of the variable to be controlled, and finally it outputs control signals to the motors 31 and 32 in order to make the difference zero. As a result, driving mechanisms 21 and 22 are properly driven to cause the jaw members 11 and 12 to change their positions. The controlling means 5 then executes feed-back control operations to move the jaw members 11 and 12 so that the interval 7 between the jaw members 11 and 12 coincides with the target value stored in the setting means 6. Simultaneously, the failure diagnostic means 50 of the controlling means 5 executes diagnostic operations in accordance with procedure of the flowchart shown in FIG. 4. Assume that the diagnostic memory 8 stores the data related to the transferred amount of the jaw members 11 and 12 of the machine 1 in the case when operation is normally underway by means of controlling means 5, i.e., the relation between the displacement value of the variable to be controlled and the response time shown in FIG. 3 in either the approximate equation or in the table format.

First, the failure diagnostic means 50 calculates the transferred amount of both the jaw members 11 and 12 during the operation, i.e., the relation between the displacement value of the variable to be controlled and the response time, for storage in diagnostic memory 8 (step S101). Next, the failure diagnostic means 50 reads out the data related to the transferred amount of the jaw members 11 and 12 sought during step S101, i.e., data correctly matching the relation between the displacement value of the variable to be controlled and the response time during normal operation, from diagnostic memory 8 (step S102). In executing the next step S103, the diagnostic means 50 computes the difference of the response time corresponding to the identical transferred amount (displacement value) of the jaw members 11 and 12. When the difference is less than the predetermined reference value, failure diagnostic means 50 then identifies that neither a failure nor an abnormal condition is present and allows the controlling means 5 to continue control operations.

Conversely, when the difference of the response time is more than the predetermined reference value, it indicates that the jaw members 11 and 12 are taking an abnormally long time to move a specific distance, or conversely, they spend an abnormally short amount of time to transfer a specific distance. Either of these symptoms indicates that a failure and/or an abnormal condition is present. In either of these cases, the failure diagnostic means 50 causes the controlling means 5 to immediately discontinue further control operations, and simultaneously, the failure diagnostic means 50 causes a display system to distinctly display the probable failure or abnormal system or causes the generation of a alarm based on the duration of the respective time (step S104).

When either of these abnormal symptoms are detected, the preferred embodiment also allows the activation of a safety device, for example, instead of stopping the control operations executed by the controlling means 5.

Figure 3:
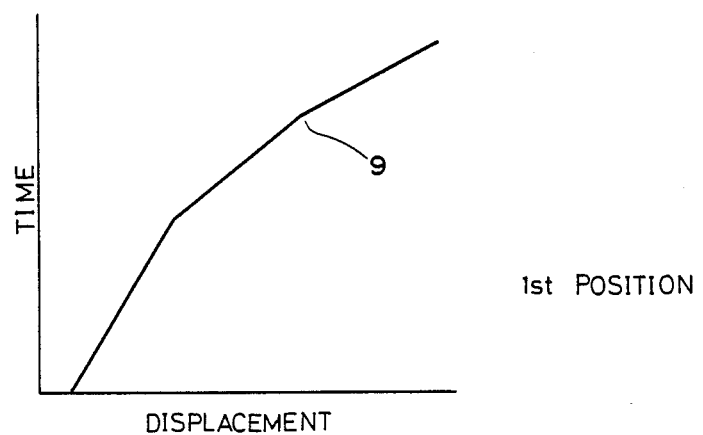
FIG. 3 is a graphical presentation showing the displaced condition of the variable during normal operations to be stored in memory of the diagnostic apparatus of the present invention.
Figure 3:
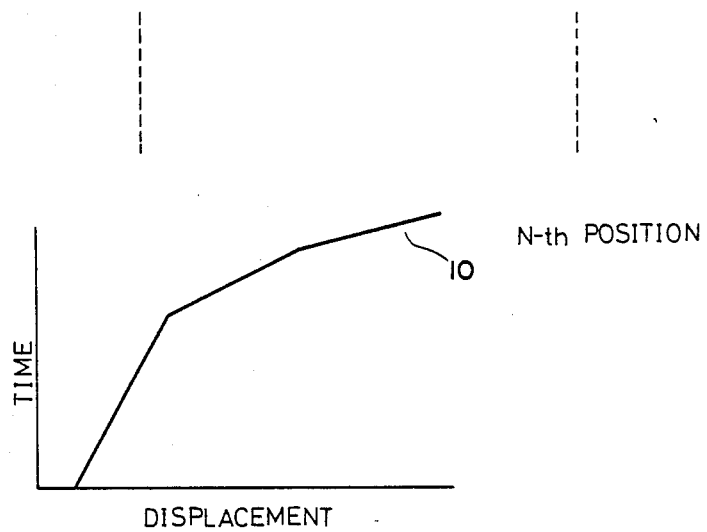
Figure 4:
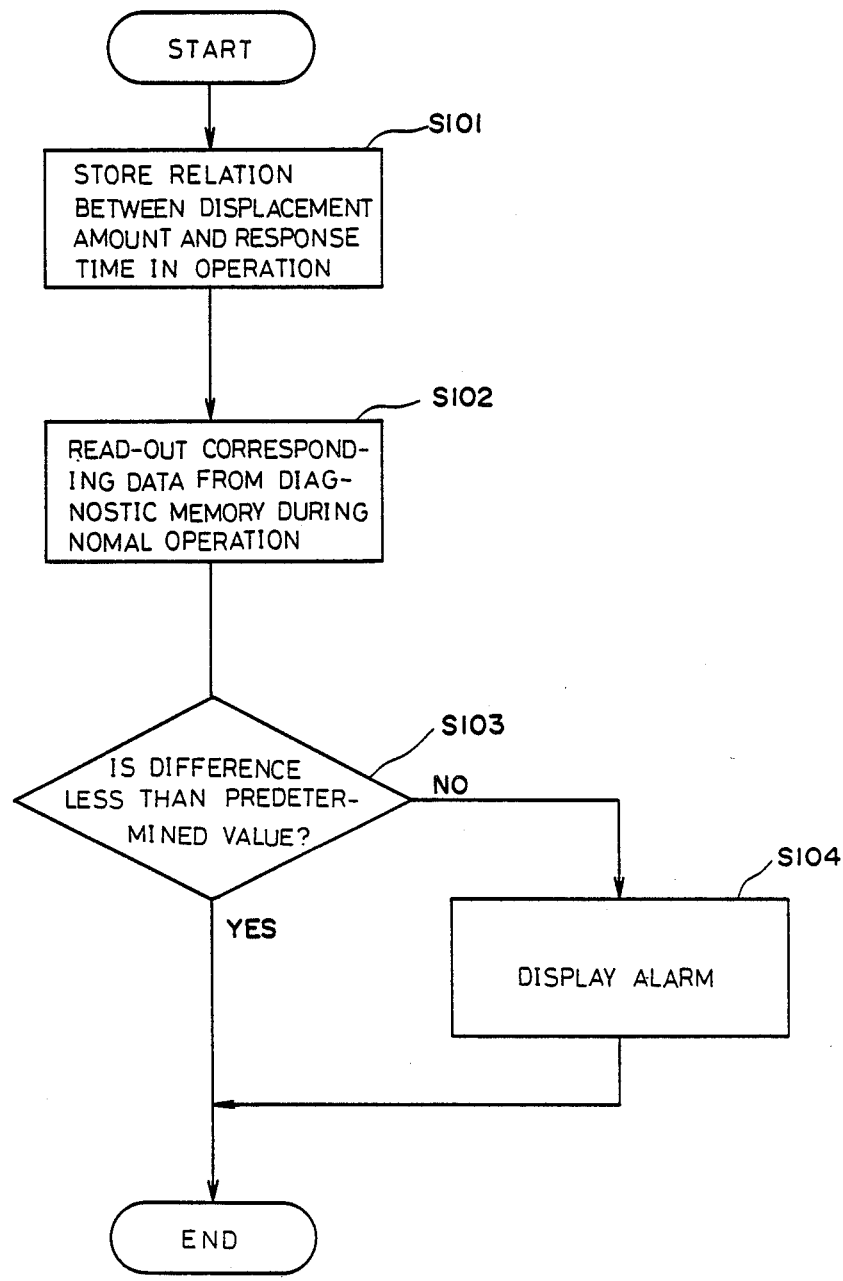
FIG. 4 is a flowchart showing the a preferred mode of operation of the diagnostic apparatus of the present invention.

The transferred amount of the jaw members 11 and 12 of the machine 1 to be controlled under operation, i.e., the relation between the displacement value of the variable to be controlled of the machine 1 and the response time varies itself as time passes by relative to the movement of the jaw members 11 and 12. Consequently, as shown in FIG. 3, it is quite necessary for the system to store the constantly renewed relation between the displacement value and the response time during normally executing control operations in the first through N-th positions.

Note that the preferred embodiment described above has assumed a case in which positions of both the jaw members 11 and 12 of the machine 1 to be controlled are made available for the variable to be controlled. However, the present invention also provides means for diagnosing the presence or absence of any failure and/or abnormal condition on the basis of the moving speed of the jaw members 11 and 12 of the machine 1 detected by speed sensor means as another preferred embodiment.

According to the diagnostic apparatus of the present invention, when setting the variable to be controlled, such as the positions and speed of the jaw members for example, provided for material processing machinery to the controlling means, it is possible for the failure diagnostic means to precisely diagnose the presence or absence of any failure by referring to the transient response of the variable to be controlled. This allows the entire system to securely detect any failure in early stage. In addition, since the processing system incorporating the diagnostic apparatus of the present invention dispenses with particular operations for checking the presence of failure, labor is effectively saved.

As this invention may be embodied in several forms without departing from the spirit of essential characteristics thereof, the present embodiment is therefore illustrative and not restrictive, since the scope of the invention is defined by the appended claims rather than by the description preceding them, and all devices that fall within the metes and bounds of the claims, or equivalents of such devices are therefore intended to be embraced by the claims.

What is claimed is:

1. A diagnostic apparatus for diagnosing a failure of a machine including at least one movable member which is operated to make a variable to be controlled coincide with a target value comprising:
    setting means for setting said target value;
    means for sensing a position of said movable member;
    controlling means, responsive to said setting means and said sensing means, for controlling said variable to coincide with said target value set by said setting means by moving said member; and
    diagnostic member for storing for each of a plurality of predetermined positions of said movable member a respective relation between a displacement amount of said variable while said machine is normally operated by said controlling means and the response time required therefor,
    said controlling means including a failure diagnostic means for detecting an actual displacement amount of said variable and an actual response time required therefor, and for comparing a relation between said actual displacement amount and said actual response time with the relation stored in said diagnostic memory for the position of said member sensed by said sensing means while said machine is normally operated.

2. A diagnostic apparatus as claimed in claim 1 wherein said variable is the position of said movable member.

3. A diagnostic apparatus as claimed in claim 1 wherein said variable is the transfer speed of said movable member.

4. An apparatus for detecting a malfunction of a machine including at least one movable member, comprising:
    means for varying an operational parameter of said machine to cause an actual value of said operational parameter to approach a target value of said parameter;
    means, responsive to said varying means, for measuring an actual rate at which said varying means is varying said operational parameter;
    means for sensing a position of said at least one movable member;
    means for storing for each of a plurality of predetermined positions of said movable member a normal rate at which said varying means varies said operational parameter in the absence of a malfunction; and
    means, responsive to said rate measuring means and said storing means, for calculating a difference between said normal rate for the predetermined position corresponding to the sensed position of said movable member and said actual rate and for generating a malfunction indication if an absolute value of said difference exceeds a predetermined threshold amount.

5. A method of detecting a malfunction in a machine including at least one movable member, comprising the steps of:
    (a) varying an operational parameter of said machine to cause an actual value of said operational parameter to approach a target value of said operational parameter;
    (b) sensing a position of said movable member;
    (c) storing for each of a plurality of predetermined positions of said movable member a normal rate at which said varying means varies said operational parameter;
    (d) measuring an actual rate at which said varying means is varying said operational parameter;
    (e) calculating a difference between said normal rate for the predetermined position corresponding to sensed position of said member and said actual rate; and
    (f) generating a malfunction indication if an absolute value of said difference exceeds a predetermined threshold amount.

* * * * *